United States Patent
Okada et al.

(10) Patent No.: US 7,999,859 B2
(45) Date of Patent: Aug. 16, 2011

(54) DIGITAL CAMERA FOR RECORDING A STILL IMAGE WHILE SHOOTING A MOVING IMAGE

(75) Inventors: Shigeyuki Okada, Ogaki (JP); Hiroshi Hanafusa, Hirakata (JP); Noriaki Kojima, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 209 days.

(21) Appl. No.: 12/076,702

(22) Filed: Mar. 21, 2008

(65) Prior Publication Data

US 2008/0174666 A1 Jul. 24, 2008

Related U.S. Application Data

(62) Division of application No. 10/148,886, filed as application No. PCT/JP00/08977 on Dec. 18, 2000, now Pat. No. 7,489,348.

(30) Foreign Application Priority Data

Dec. 24, 1999 (JP) .................................. 11-365978
Mar. 15, 2000 (JP) ................................ 2000-071782
Mar. 30, 2000 (JP) ................................ 2000-095699

(51) Int. Cl.
*H04N 5/76* (2006.01)
*H04N 5/222* (2006.01)

(52) U.S. Cl. ................. 348/231.2; 348/333.02; 348/273

(58) Field of Classification Search .................. 348/143, 348/149, 224.1, 231.1, 231.2, 240.1, 273, 348/333.02

See application file for complete search history.

(56) References Cited

U.S. PATENT DOCUMENTS 4,691,253 A 9/1987 Silver
(Continued)

FOREIGN PATENT DOCUMENTS

JP 04-068770 3/1992
(Continued)

OTHER PUBLICATIONS

Korean Office Action dated May 25, 2009, issued in corresponding Korean patent application No. 10-2008-7008539.

(Continued)

*Primary Examiner* — Hung H Lam
(74) *Attorney, Agent, or Firm* — McDermott Will & Emery LLP

(57) ABSTRACT

In a digital camera, when snapshot shooting is instructed during recording of a moving image, a shot still image is temporarily pushed aside in a memory area for use in pushing aside (7a) in a frame buffer (7). A currently shooting motion image and a still image are displayed in parallel on a display (9), so that a user can confirm a content of a snapshot. The moving image continues to be recorded even during a push-aside operation. After a moving image processing is completed, the still image is processed by an image correcting circuit (4). The frame buffer (7) comprises a plurality of frame recording areas, and is shared on the occasions of a moving image processing and a still image processing. In a normal moving image processing, these areas are utilized in a cyclic manner, and when the still image is shot, any of areas will be utilized. Thereafter, the rest of areas are utilized in the cyclic manner for the moving images. The recording function for the moving image and still image is improved at low cost, it becomes easy to take a snapshot, and the merchandise size is not increased.

19 Claims, 10 Drawing Sheets

U.S. PATENT DOCUMENTS

| | | | |
|---|---|---|---|
| 5,367,332 | A | 11/1994 | Kerns et al. |
| 5,923,816 | A | 7/1999 | Ueda |
| 5,990,860 | A | 11/1999 | Takeuchi |
| 5,999,693 | A | 12/1999 | Juri et al. |
| 6,359,649 | B1 | 3/2002 | Suzuki |
| 6,377,301 | B1* | 4/2002 | Hieda ................. 348/231.99 |
| 6,442,336 | B1* | 8/2002 | Lemelson ................. 386/117 |
| 6,486,914 | B1* | 11/2002 | Anderson ............... 348/333.02 |
| 6,522,352 | B1 | 2/2003 | Strandwitz et al. |
| 6,603,866 | B1 | 8/2003 | Motono et al. |
| 6,665,453 | B2 | 12/2003 | Scheurich |
| 6,813,312 | B2 | 11/2004 | Tullberg et al. |
| 2001/0014202 | A1 | 8/2001 | Honda et al. |
| 2002/0015447 | A1 | 2/2002 | Zhou |
| 2002/0018114 | A1* | 2/2002 | Shibata et al. ............ 348/14.07 |
| 2003/0112347 | A1 | 6/2003 | Wyman |
| 2003/0123859 | A1* | 7/2003 | Ikeda ............... 386/120 |
| 2004/0066970 | A1 | 4/2004 | Matsugu |
| 2005/0041132 | A1 | 2/2005 | Juen et al. |
| 2005/0146623 | A1 | 7/2005 | Juen |

FOREIGN PATENT DOCUMENTS

| | | |
|---|---|---|
| JP | 2922598 | 3/1992 |
| JP | H 04-129488 A | 4/1992 |
| JP | H 4-269936 A | 9/1992 |
| JP | H 5-236412 A | 9/1993 |
| JP | 8-275034 | 10/1996 |
| JP | 09-284718 | 10/1997 |
| JP | 10-108121 | 4/1998 |
| JP | 10-191029 | 7/1998 |
| JP | 10-276402 | 10/1998 |
| JP | 10-276402 A | 10/1998 |
| JP | 10-308916 | 11/1998 |
| JP | H 10-327339 A | 12/1998 |
| JP | 11-055617 | 2/1999 |
| JP | 11-055617 A | 2/1999 |
| JP | H 11-075148 | 3/1999 |
| JP | H 11-308488 A | 11/1999 |
| JP | 11-341418 A | 12/1999 |
| JP | 2000-50263 | 2/2000 |
| JP | 2000-078486 | 3/2000 |
| JP | 2000-78486 | 3/2000 |
| JP | 2000-261806 A | 9/2000 |
| JP | 2001-016490 A | 1/2001 |
| JP | 2001-245299 | 9/2001 |
| JP | 2001-333301 | 11/2001 |
| KR | 1997-0031839 | 6/1997 |

OTHER PUBLICATIONS

Korean Office Action dated May 19, 2008, corresponding Korean Patent Application No. 10-2008-7008539.

International Search Report dated Feb. 27, 2001, Application No. PCT/JP00/08977.

Japanese Office Action dated Oct. 18, 2002, Application No. 2000-388760.

Japanese Office Action dated Oct. 18, 2002, Application No. 2000-066074.

Japanese Office Action dated Dec. 16, 2003, Application No. 2001-066075.

"Written Opposition" submitted by the opponent in the opposition to the patent and the partial English translation herewith.

Japanese Office Action—Notification for Reasons for Revocation dated Jul. 9, 2004, for Patent No. 3398138, with Japanese Patent No. 3398138.

Opponent's Exhibit 1—Japanese Laid Open Patent Application No. 4-129488 (relevant portions).

Opponent's Exhibit 2—Japanese Laid Open Patent Application No. 10-327339 (relevant portions).

Opponent's Exhibit 3—Japanese Laid Open Patent Application No. 11-75148 (relevant portions).

Japanese Office Action—Decision of Refusal dated Aug. 3, 2004, Application No. 2001-066075 with Japanese Patent Application No. 2001-66075 with relevant portions of cited Japanese Application No. 11-75148 (paragraphs [0047], [0048], and [0063].

Japanese Office Action dated Oct. 18, 2005, Application No. 2004-260855, which is a divisional of Japanese patent application JP 2001-066075, claiming priority of JP 2000-071782.

Notice of Reasons for Refusal dated May 9, 2006, Ref. No. NPC1040142.

Notice of Reasons for Refusal dated May 9, 2006, Ref. No. NQC1050096.

Decision of Refusal for Japanese Patent Application No. 2004-276235 dated Aug. 1, 2006.

Decision of Refusal for Japanese Patent Application No. 2005-187777 dated Aug. 1, 2006.

Korean Office Action dated Feb. 13, 2007, Application No. 10-2002-7007932.

Written Amendment dated Nov. 22, 2006, Application No. 2004-035124, which claims priority of JP 2000-071782.

Korean Office Action dated Sep. 11, 2007, Application No. 10-2007-7016031.

Chinese Office Action dated Sep. 7, 2007, Application No. 00817749.X.

Japanese Office Action dated Feb. 17, 2009, issued in corresponding Japanese Patent Application No. 2006-266540.

Japanese Office Action dated Feb. 17, 2009, issued in corresponding Japanese Patent Application No. 2006-266541.

Japanese Office Action dated Feb. 17, 2009, issued in corresponding Japanese Patent Application No. 2006-266542.

Korean Office Action dated Mar. 10, 2008, Application No. 10-2007-7016031.

Japanese Office Action, Questioning issued on Jun. 24, 2008 for corresponding Japanese Patent Application No. 2004-35124.

Response to Questioning in corresponding Japanese Application No. 2004-35124, submitted Jul. 9, 2008.

Korean Office Action dated Nov. 11, 2008, Application No. 10-2008-7008539.

United States Office Action issued in U.S. Appl. No. 12/076,715 dated Dec. 22, 2010.

United States Office Action issued in U.S. Appl. No. 12/076,717 dated Nov. 10, 2010.

United States Notice of Allowance issued in U.S. Appl. No. 12/076,717, mailed Mar. 3, 2011.

United States Office Action issued in U.S. Appl. No. 12/076,703, mailed Jan. 12, 2011.

United States Office Action issued in U.S. Appl. No. 12/076,715 dated Jun. 1, 2011.

* cited by examiner

DIGITAL CAMERA FOR RECORDING A STILL IMAGE WHILE SHOOTING A MOVING IMAGE

CROSS-REFERENCE TO RELATED APPLICATIONS

This application is a Divisional of application Ser. No. 10/148,886, filed on Oct. 18, 2002, and wherein application Ser. No. 10/148,886 is a national stage application filed under 35 USC §371 of International Application No. PCT/JP00/08977, filed Dec. 18, 2000, the contents of which are incorporated herein by reference in their entirety.

TECHNICAL FIELD

The present invention relates to a digital camera such as a memory control device and an electronic still camera. The present invention also relates to an image processing method and an image processing apparatus which can be used therefor. The present invention relates to technology in which to code or decode according to the MPEG (Moving Picture Expert Group) and JPEG (Joint Photographic Coding Expert Group) standards, and relates to apparatuses which utilize the technology.

BACKGROUND TECHNOLOGY

In recent years, the demand for electronic still cameras is expanding in the place of cameras using the silver-salt photographing technology developed since 19th century. In the electronic still camera, "JPEG" is used as a data compression and expansion technique in order to efficiently process image data on the occasions of transmitting and storing the image data. A technical core of the JPEG method lies in the discrete cosine transform (DCT).

Since the compression and expansion of moving image data are also possible according to the JPEG method, there is an electronic still camera using this method, which is equipped with a shooting function of the moving image. The technology in which the moving image data are compressed and expanded in units of frame by the JPEG method is called M-JPEG (Motion-JPEG).

On the other hand, "MPEG" is one of techniques in which to compress and expand multimedia data including moving images. In the MPEG method, the technical core used in the video part lies in motion compensated prediction (MC) and DCT. The coding technique combining MC and DCT is called the hybrid coding technique. It can be said that the MPEG method is the technique in which the MC is combined into the JPEG method.

In the electronic still camera utilizing the MPEG method, it is desired that a snapshot which corresponds to one frame of the moving image can be recorded during the shooting of the moving image; for example, such a technique is disclosed in Japanese Patent Application Laid-Open No. Hei11-75148. It is known that in this type of electronic still camera there is provided an exclusive-use memory area for use in pushing aside and storing snapshot data. However, in this type of camera, this exclusive-use memory area is not utilized until the snapshot shooting is instructed, so that the effective usage rate of the memory during the shooting of moving image is not enhanced. Making it compact-size and low-cost plays a crucial role in evaluation of merchandise values, and it is admitted that there is a room for improvement in terms of implementing area and cost performance. This is the first problem which the inventor of the present invention recognized.

The second problem which the inventor recognized relates also to the similar room for improvement. Since the photographed snapshot is oftentimes printed on paper medium by using a video printer or the like, high image quality is required. However, when the moving image is recorded with the same high image quality as the snapshot, the memory capacity runs out quickly. Thus, a technique is known in which the still image is recorded at the same pixel density level as that in the shooting of the still image, and the moving image whose pixel density is reduced after performing a filtering processing thereon is recorded. In this conventional technique, however, the edge smoothing of the still image or emphasis processing thereof, for example, and so forth can not be performed, thus a filter circuit needs to be newly provided in order to realize these functions.

The third problem that the inventor recognized relates to the usability of a user at the time of shooting a snapshot. Conventionally, the outcome of the photographed snapshot is confirmed only after the shooting of the moving image is completed, so that there are many occasions where the proper photographing of the snapshot is missed out when the shooting of the snapshot is mistaken. Moreover, provision of two shooting modes for the moving image and snapshot is not likely to become a use-friendly design.

DISCLOSURE OF THE INVENTION

Therefore, an objective of the present invention is to provide a technique in which to give merits in terms of implementing area or cost performance thereof in the digital cameras and related technical field thereof. Another objective of the present invention is to provide a technique in which to realize further user-friendly merchandise in the digital cameras and the related technical field. These objectives and those related thereto become gradually clearer hereinafter.

A certain mode of the present invention relates to an image processing apparatus. This apparatus comprises: a signal processing circuit which, after performing at least gamma correction or white balance adjustment on image data, outputs the image data, a still image encoder which codes the image data as a still image; a moving image encoder which codes the image data as a series of motion images; an image correcting unit, provided in an input route of the image data leading to the still image encoder and the moving image encoder, which performs a filtering processing on the image data; and a control unit which controls a series of these processings.

By implementing this structure, both the still image and the motion image can be filtering-processed by the same image correcting unit. Those filtering processings may be set in a manner such that contents thereof are made different. For example, the filtering processing performed on the image data for the still image encoder (hereinafter referred to as a "first filtering processing" also) may include a pixel value transform processing, and the filtering processing performed on the image data for the moving image encoder (hereinafter referred to as a "second filtering processing" also) may include a pixel density transform processing. A plurality of types of the first filtering processings may be prepared and there may be provided a selector which selects a desirable filtering function from these processings. The filtering processing may be able to be set to an identity transform processing in which an input coincides with an output.

This apparatus may further comprise a storage unit which temporarily stores image data for one frame, in response to a still image record instructing signal during a coding processing by the moving image encoder. This image data may be image data prior to or after correction by the image correcting unit.

Another mode of the present invention relates to an image processing method. In this method, a filtering processing is performed on image data, both generated through at least gamma correction or white balance adjustment, to be coded as a still image (hereinafter possibly abbreviated simply as "still image data") and image data to be coded as a moving image (hereinafter possibly abbreviated simply as "moving image data"), by a common image correcting unit. According to this method, an edge emphasis processing, for example, can be performed on the still image data, and a pixel number reduction processing can be performed on the motion image data.

Still another mode of the present invention relates an image processing method. In this method, a processing route of the still image data and that of the moving image data, both data having been processed by a signal processing circuit, are unified, so that they are inputted to a common image correcting unit; and a predetermined processing is performed in a time sharing manner. Namely, at the timing of performing respective processings on the still image data and the moving image data, the image correcting unit operates as the same or different processor. When the image correcting unit performs the filtering processings and the still image data and moving image data are processed, a filter coefficient may be dynamically changed.

Still another mode of the present invention relates to a digital camera. This camera includes: a signal processing circuit which performs a processing, including an A-D conversion, on a shot image signal; a still image encoder which codes image data outputted from the signal processing circuit, as a still image; a moving image encoder which codes the image data as a series of moving images; and an image correcting unit, provided in an input route of the image data leading to the still image encoder and the moving image encoder, which performs a filtering processing on the image data.

Still another mode of the present invention relates to a digital camera. This camera is capable of recording a still image during shooting of a moving image, and it comprises: a display control unit which generates an image signal by which shot image data are displayed on a display; and a control unit which, while the shot image data are being displayed on the display as a moving image, instructs the display control unit to display on the display a still image corresponding to part of the moving image, for example the still image corresponding to one frame. By this structure, when a snapshot is photographed during the recording of the moving image, the contents thereof can be confirmed, so that if the outcome thereof is not satisfactory one can shoot again another snapshot.

Still another mode of the present invention relates to a digital camera. This camera comprises: a still image encoder which codes shot image data as a still image; a moving image encoder which codes the shot image data as a series of moving images; a recording unit which records image data coded by the still image encoder and the moving image encoder; a display control unit which generates an image signal by which the shot image data are displayed on a display; and a control unit which controls a series of processings, wherein the control unit is structured such that, while the shot image data are being displayed on the display as a moving image, image data shot at a timing responsive to a still image shooting instruction signal is displayed on the display. This camera may further comprise a unit, such as an operational button and a switch or the like, which inputs a shooting instruction of the still image.

The control unit may control the display control unit in a manner such that the motion image and the still image are displayed in parallel. By operations of the control unit, either one of the still image or the motion image displayed in parallel may be set to a main picture of the display so as to be displayed thereon, and these may be switchable, and, for example, permission or denial of the display of the still image may be able to be set. The still image may be displayed for a predetermined period of time, and the displayed period of time may be determined according to a user's instruction. When the still image is displayed, the user may be able to erase it, for example, by pressing a predetermined button.

Still another mode of the present invention relates to a digital camera. This camera is capable of recording a snapshot during shooting of the moving image, and it comprises: a display control unit which generates an image signal by which shot image data are displayed on a display; and a control unit which, while the shot image data are being displayed on the display as a moving image, instructs the display control unit to display the snapshot on the display.

Still another mode of the present invention relates to an image processing method in the digital camera. This method includes: a processing of shooting a moving image; a processing of shooting a snapshot during shooting of the moving image; a processing of displaying the shot moving image; and a processing of displaying the shot snapshot, wherein the moving image and the snapshot are displayed in the digital camera in a simultaneously visible manner. In addition to a case in which the motion image and the snapshot are displayed in parallel on a single display, they may be displayed on different displays and it suffices as long as they are simultaneously visible. Moreover, this simultaneous visible state may be generated for a predetermined limited duration of time.

Still another mode of the present invention relates to a memory control device. This device comprises: a storage unit which includes a plurality of memory areas which sequentially stores inputted data; and a control unit which controls input-output of the storage unit in a manner that the memory areas are used cyclically, wherein input-output of the storage unit is controlled by the control unit in a manner that, when the control unit stores data in arbitrary memory area within a plurality of the memory areas, the remaining memory areas are used cyclically. In each memory area, the data may be stored in predetermined units of block, for example in units of image frame or in units of data's coded group.

Still another mode of the present invention relates to a digital camera. This digital camera is equipped with the above-described memory control device and is capable of recording a still image corresponding to part of a moving image during shooting of the moving image. The storage unit sequentially stores inputted moving image data in a plurality of the memory areas. The control unit controls input-output of the storage unit in a manner that when the data are taken in at a store-the-still-image instructing timing, in a plurality of the memory areas the moving image data are taken into the remaining memory areas excluding the memory area which stored said data.

The control unit may control in a manner that when data are again taken in at the store-the-still-image instructing timing, previously stored data are cancelled, namely, overwrite by other data is permitted, and the moving image data are taken into the rest of the memory areas excluding the memory area which stores newly taken-in data. Alternatively, it may control in a manner that the moving image data are taken into the remaining memory areas excluding the memory areas that store the previously stored data and the memory areas that store newly taken-in data.

Still another mode of the present invention relates to an image processing apparatus equipped with a memory control device which performs a control by which image data are stored in a memory. This memory includes a put-to-common-use area which temporary stores moving image data and still image data so as to be respectively given to predetermined image processings. When storing the still image data, the memory control device utilizes an area, in the put-to-common-use area, having moving image data whose processing has been completed, and when storing the moving image data the memory control device sequentially utilizes areas other than those which store unprocessed still image data in the put-to-common-use area.

A digital camera equipped with this image processing apparatus may be provided. In that case, when shooting of a still image is instructed for the second time during shooting of a moving image, the memory control device, on the occasion of storing still image data for the second time, may utilize an area other than that which stores the still image data shot for the first time. This digital camera may further comprise a control unit which, according to a user's instruction, selects either one of the still image data shot for the first time or the still image data shot for the second time, so as to be finally stored. Moreover, on the occasion of storing still image data for the second time, the area which stores the still image data shot for the first time, may be utilized by overwriting contents thereof.

Moreover, arbitrary combinations of the above-described elements and so forth, as well as expressions thereof changed between a method, an apparatus, a recording medium, a computer program, etc. are encompassed by the scope of the present invention.

BRIEF DESCRIPTION OF THE DRAWINGS

The above described objectives, other objectives, features and advantages are further made clear by the following preferred embodiments and drawings accompanied thereby.

THE BEST MODE FOR CARRYING OUT THE INVENTION

Figure 1:
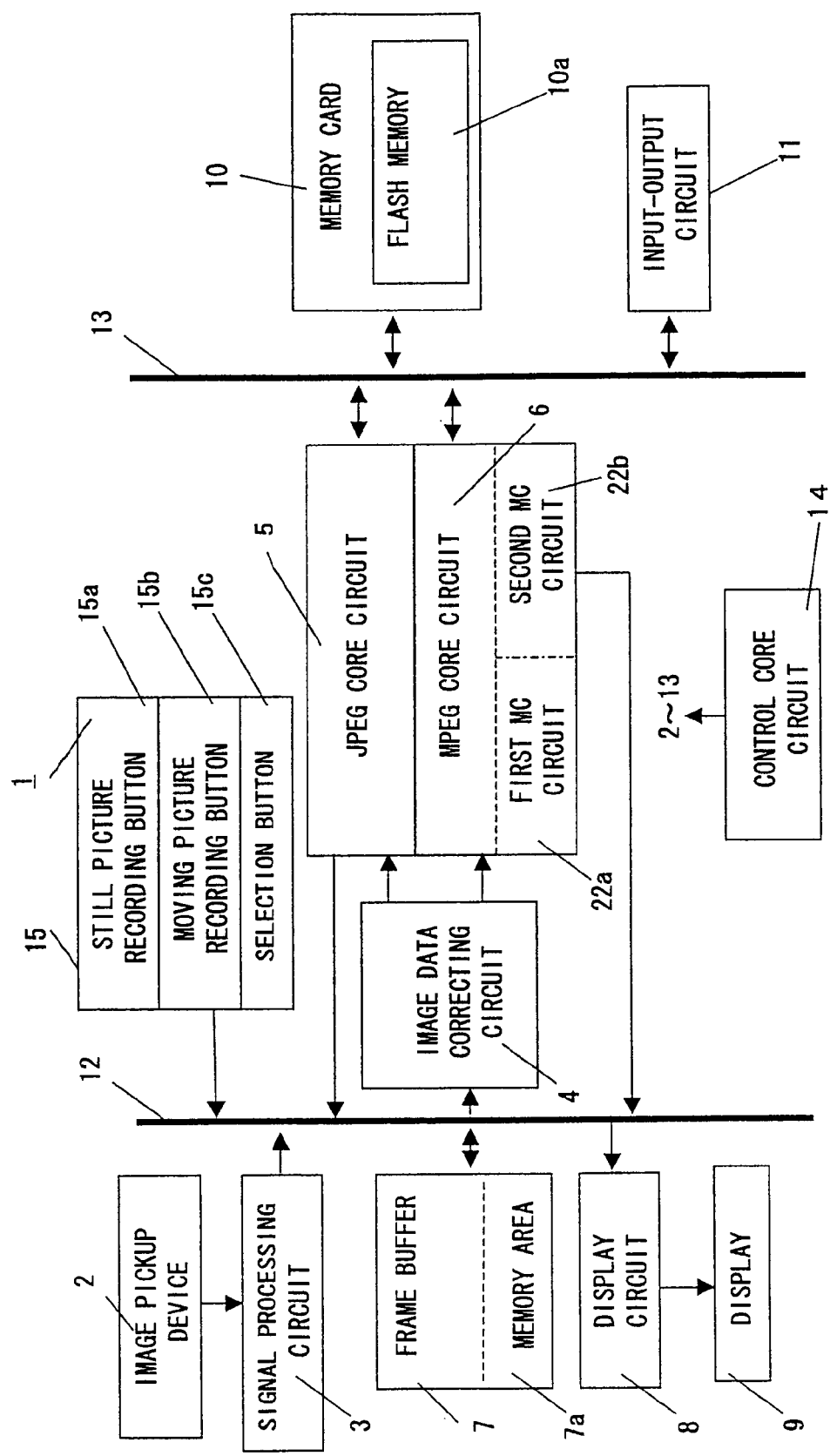
FIG. 1 is a block circuit diagram showing an electronic still camera according to an embodiment in which the present invention is embodied.

FIG. 1 is a block circuit diagram showing an electronic still camera 1 utilizing JPEG and MPEG method according to an embodiment.

The electronic still camera 1 comprises an image pickup device 2, a signal processing circuit 3, an image data correcting circuit 4, a JPEG core circuit 5, an MPEG core circuit 6, a frame buffer 7, a display circuit 8, a display 9, a memory card 10, input-output circuit 11, data buses 12 and 13, a control core circuit 14 and a group of operational buttons 15.

The control core circuit 14 controls each component 2-13 of the electronic still camera 1 in response to an ON-OFF signal of the group of operational buttons 15. The group of buttons 15 includes a still picture recording button 15a, a moving picture recording button 15b and other selection buttons 15c.

The image pickup device 2 comprises a CCD (Charge Coupled Device) and so forth, and shoots a subject image so as to generate an output signal. The signal processing circuit 3, which includes an A-D converting circuit, generates original image data, for example, whose pixel number is vertical 1200× horizontal 1600, in units of picture, by performing white balance adjustment and gamma correction and so forth after the output signal of the image pickup device 2 is A-D converted. The original image data generated by the signal processing circuit 3 is transferred to either of the frame buffer 7 or the display circuit 8, or both thereof via the data bus. The display circuit 8 generates an image signal from image data, in a single picture unit, transferred via the data bus 12. The display 9 displays the image signal generated by the display circuit 8, as a subject image.

The frame buffer 7 comprises a rewritable semiconductor memory such as SDRAM (Synchronous Dynamic RAM), DRAM, Rambus DRAM and the like, stores pictures transferred via the data bus 12, namely, stores the image data in units of frame, and reads out the stored image data picture by picture. In this frame buffer 7, there is provided a memory area 7a (hereinafter referred to also as a memory area for use in pushing aside 7a) which temporarily pushes aside applicable still image data for one frame and stores it in response to an ON signal of the still picture recording button 15a during recording of moving images.

The picture-by-picture image data read out from the frame buffer 7 are transferred to the image data correction unit 4 via the data bus 12. The image data correction circuit 4 performs a correction processing, which will be described later, on image data inputted from the signal processing circuit 3. The picture-by-picture image data, generated from the image data correcting circuit 4, on which the correction processing has been performed, are transferred to the JPEG core circuit 5 or the MPEG core circuit 6 via the data bus 12.

The memory card 10 is mounted on the electronic still camera 1 in a detachable manner and includes a flash memory 10a therein. The flash memory 10a stores picture-by-picture compressed image data transferred via the data bus 13, and reads out the stored compressed image data picture by picture so as to be outputted to the data bus 13.

The input-output circuit 11 outputs picture-by-picture image data transferred via the data bus 13 to external apparatuses connected to the electronic still camera 1, for example, an external display, a personal computer, a printer or the like, and outputs image data inputted from these external apparatuses, to the data bus 13. The image data read out from the memory card 10 or the image data inputted via the input-output circuit 11 are transferred to the JPEG core circuit 5 or the MPEG core circuit 6 via the data bus 13.

Figure 2:
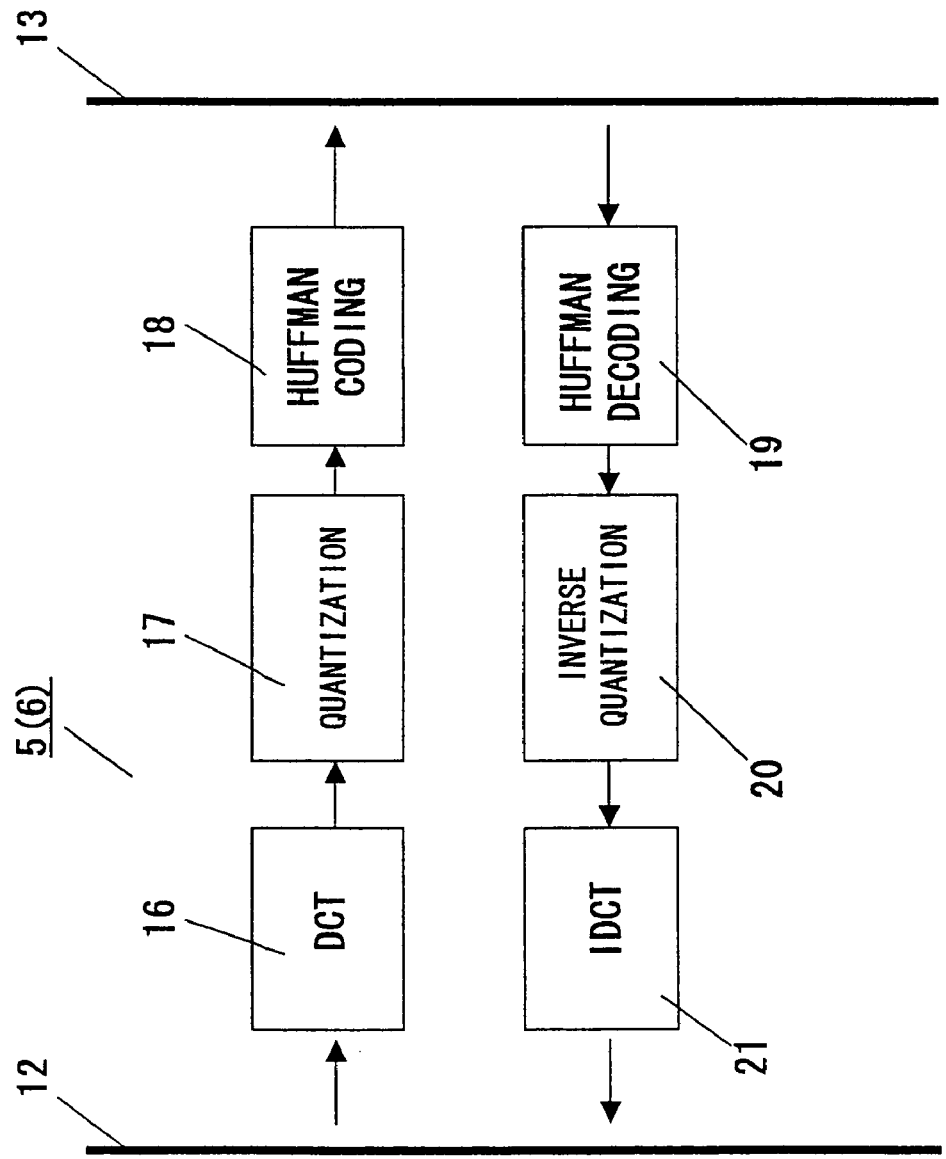
FIG. 2 is a schematic block diagram showing a JPEG core circuit and an MPEG core circuit according to the present embodiment.

As shown in FIG. 2, the JPEG core circuit 5 comprises a DCT circuit 16, a quantization circuit 17, a Huffman coding circuit 18, a Huffman decoding circuit 19, an inverse quantization circuit 20, and an inverse DCT (IDCT; Inverse DCT) circuit 21. In the JPEG core circuit 5, image data of one picture are divided into a plurality of macroblocks set by standards of the JPEG method, and then a compression-expansion processing is performed thereon for each block. The DCT circuit 16, the quantization circuit 17 and the Huffman coding circuit 18 constitute a JPEG encoder so as to perform the compression-coding processing on still image data, and the Huffman decoding circuit 19, the inverse quantization circuit 20 and the inverse DCT circuit 21 constitute a JPEG decoder. The JPEG core circuit 5 or the JPEG encoder serves as an example of "a still image encoder" in the present invention.

The DCT circuit 16 takes in image data of one picture in one block unit, against picture-by-picture image data read out from the frame buffer 7, and a two-dimensional discrete cosine transform (DCT: Discrete Cosine Transform) is performed on the image data so as to generate DCT coefficients. The quantization circuit 17 quantizes the DCT coefficient supplied from the DCT circuit 16, by referring to a quantization threshold value stored in a quantization table stored in a RAM (not shown).

The Huffman coding circuit 18 performs variable-length coding on the DCT coefficients quantized by the quantization circuit 17, by referring to Huffman codes stored in a Huffman table stored in a RAM (not shown), so that compressed image data are generated picture by picture. The compressed image data generated by the Huffman coding circuit 18 are transferred to at least one of the memory card 10 or the input-output circuit 11 via the data bus 13.

The MPEG core circuit 6 is constituted by adding first and second MC (motion compensated prediction) circuits 22a and 22b to the Huffman coding circuit 18. Thus, the DCT circuit 16, quantization circuit 17, Huffman coding circuit 18, Huffman decoding circuit 19, inverse quantization circuit 20, and inverse DCT circuit 21 are shared by the JPEG core circuit 5 and the MPEG core circuit 6, and whether to use the JPEG core circuit 5 or the MPEG core circuit 6 in which the first and second MC circuits 22a and 22b are added to this circuit 5 is selected by a switch signal from the control core circuit 14. It is presupposed that the JPEG and the MPEG are provided with the above-described quantization table and Huffman table, separately.

In the MPEG core circuit 6, image data of one picture are divided into a plurality of macroblocks set by standards of the MPEG method, and then a compression-expansion processing is performed thereon for each block. The DCT circuit 16, the quantization circuit 17, the Huffman coding circuit 18 and the first MC circuit 22a constitute an MPEG encoder so as to perform the compression-coding processing on moving image data, and the Huffman decoding circuit 19, the inverse quantization circuit 20 and the inverse DCT circuit 21 and the second MC circuit 22b constitute an MPEG decoder. The MPEG core circuit 6 or the MPEG encoder serves as an example of "a moving image encoder" in the present invention. The compressed image data generated by the MPEG encoder, too, are transferred to at least one of the memory card 10 or the input-output circuit 11 via the data bus 13.

In the JPEG core circuit 5 or the MPEG core circuit 6, the Huffman decoding circuit 19 performs the variable-length decoding on the picture-by-picture compressed image data transferred via the data bus 13 by referring to Huffman codes, so that expanded image data are generated picture by picture. The inverse quantization circuit 20 inverse-quantizes the picture-by-picture expanded image data generated by the Huffman decoding circuit 19, by referring to the quantization threshold value, so as to generate DCT coefficients.

The inverse DCT circuit 21 performs the two-dimensional inverse discrete cosine transform (IDCT: Inverse DCT) on the DCT coefficients generated by the inverse quantization circuit 20. In the MPEG core circuit 6, the second MC circuit 22b performs an MC processing on the picture-by-picture expanded image data on which the inverse discrete cosine transform has been performed by the inverse DCT circuit 21.

The expanded image data from the JPEG core circuit 5 or the MPEG core circuit 6 are transferred to the frame buffer 7 via the data bus 12. The frame buffer 7 stores the transferred picture-by-picture image data. The display circuit 8 generates an image signal, from the picture-by-picture image data transferred from the frame buffer 7 via the data bus 12, so that the signal is displayed on the display 9 as a subject image.

Figure 3:
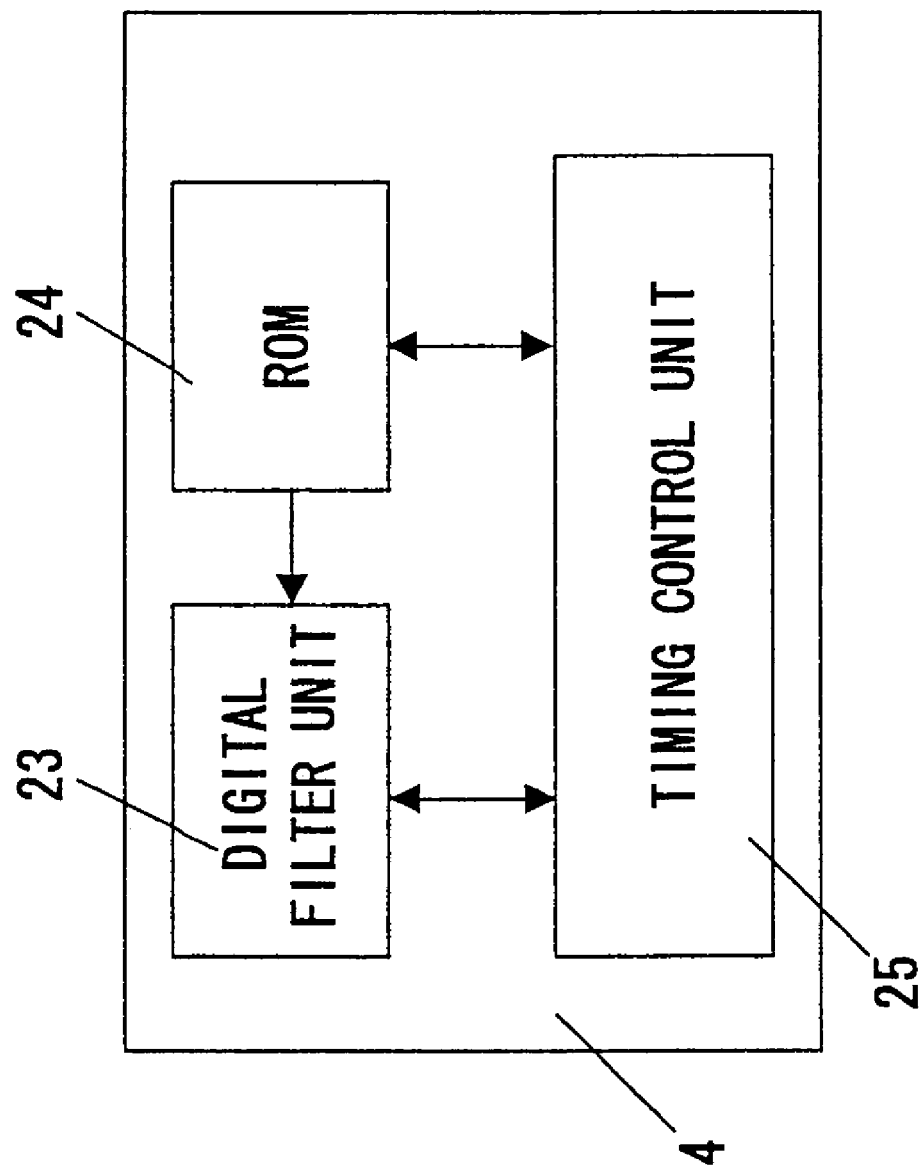
FIG. 3 is a schematic block diagram showing an image data correcting circuit according to the present embodiment.
Figure 4:
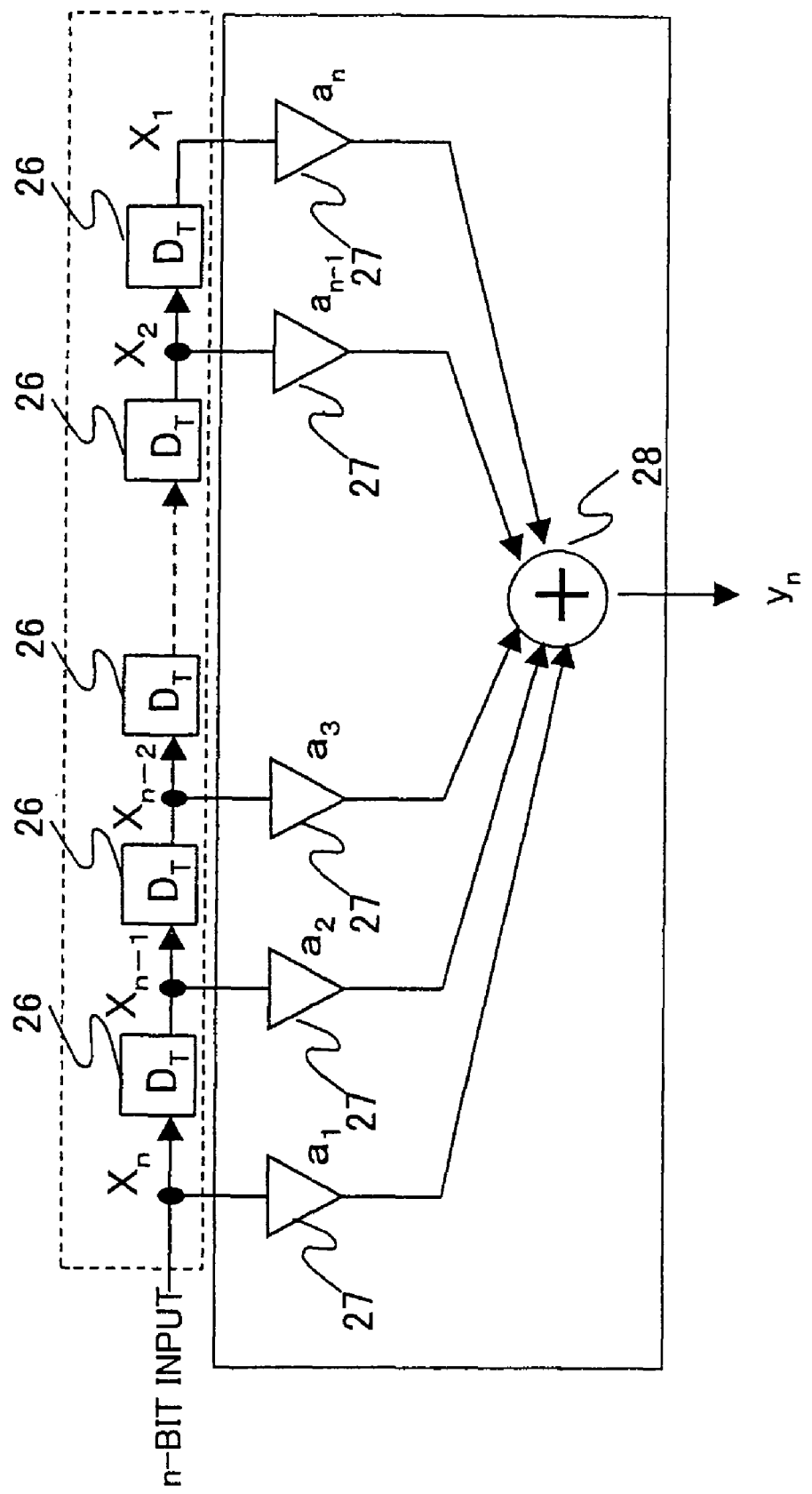
FIG. 4 is a circuit diagram showing a filter unit of the image data correcting circuit according to the present embodiment.

As shown in FIG. 3, the image data correcting unit 4 comprises a digital filter unit 23, a ROM 24 and a timing control unit 25. The digital filter unit 23 includes a spatial filter which is a non-cyclic type digital filter, for example, an FIR (Finite Impulse Response) filter. The digital filter unit 23 comprises, as shown in FIG. 4, n units of delay elements 26 . . . , which delay n bits of input signal inputted from the signal processing circuit 3 for every sampling cycle, n+1 units of multipliers 27 . . . , and an adder 28 which convolutes signals from the multipliers 27 . . . . The respective coefficients $a_n, a_{n-1} \ldots a_2, a_1$ of the multipliers 27 . . . are coefficients that determine the characteristics of the filter, and coefficients for use with a filtering processing of the moving image data and those for use with a filtering processing of the still image data are written in advance in the ROM 24. These coefficients are in advance set to proper values through simulation at a manufacturing stage.

For example, when the moving image data are filtering-processed, satisfactory low-pixel-density images are achieved by changing the value of each coefficient for every sampling cycle by the use of the concepts of linear interpolation and others. As an example, let us consider the case of reducing the horizontal number of pixels to $2/3$. Suppose that there are three pixels $p_1$ to $p_3$ placed side by side horizontally in an original image. Now these pixels are converted into two pixels $q_1$ and $q_2$ by the filtering processing for the moving image data. To accomplish this, $q_1$ and $q_2$ are each expressed as primary linear sum of $p_1$, $p_2$ and $p_3$. Namely, a filtering processing for reducing a data amount is realized by determining each coefficient of the linear sums by experiment or like means upon deciding on the ratio by which to express a degree of reduction in the number of pixels. As an example, the number of pixels may be reduced to 480 (vertical)×720 (horizontal).

On the other hand, when the filtering processing is performed on the still image data, a high-pass filter may be formed by setting each coefficient so that a high-frequency region is emphasized. Thereby, a sharp image having less deterioration at edge portions can be obtained while the number of pixels is kept at a constant rate. Though n=8 is set in the present embodiment, this of course may vary according to the freedom of designing.

The timing control unit 25 controls the timing at which the coefficient is read out from the ROM 24, the timing of the latch of input-output data, the timing of filter operation and so forth, according to the control of the control core circuit 14.

Figure 5:
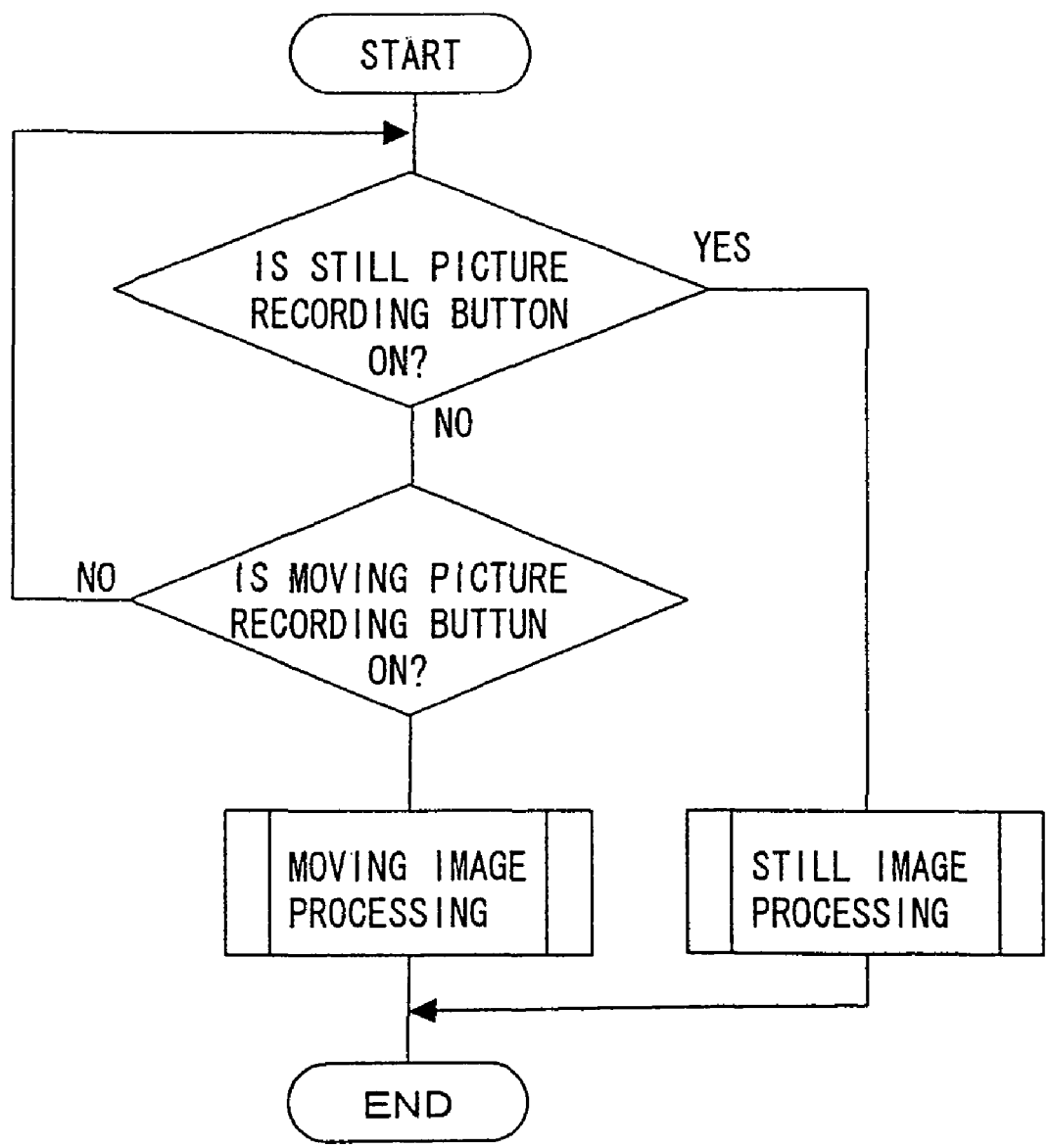
FIG. 5 is a flowchart showing operations of the electronic still camera according to the present embodiment.

Based on the above-described structure, operations for recording the image data will be described with reference to flowcharts shown in FIG. 5 to FIG. 8. In FIG. 5, the still image processing shown in FIG. 6 is performed when the still picture recording button 15*a* is switched ON while the moving image processing shown in FIG. 7 is performed when the moving picture recording button 15*b* is switched ON.

(Still Image Recording)

Figure 6:
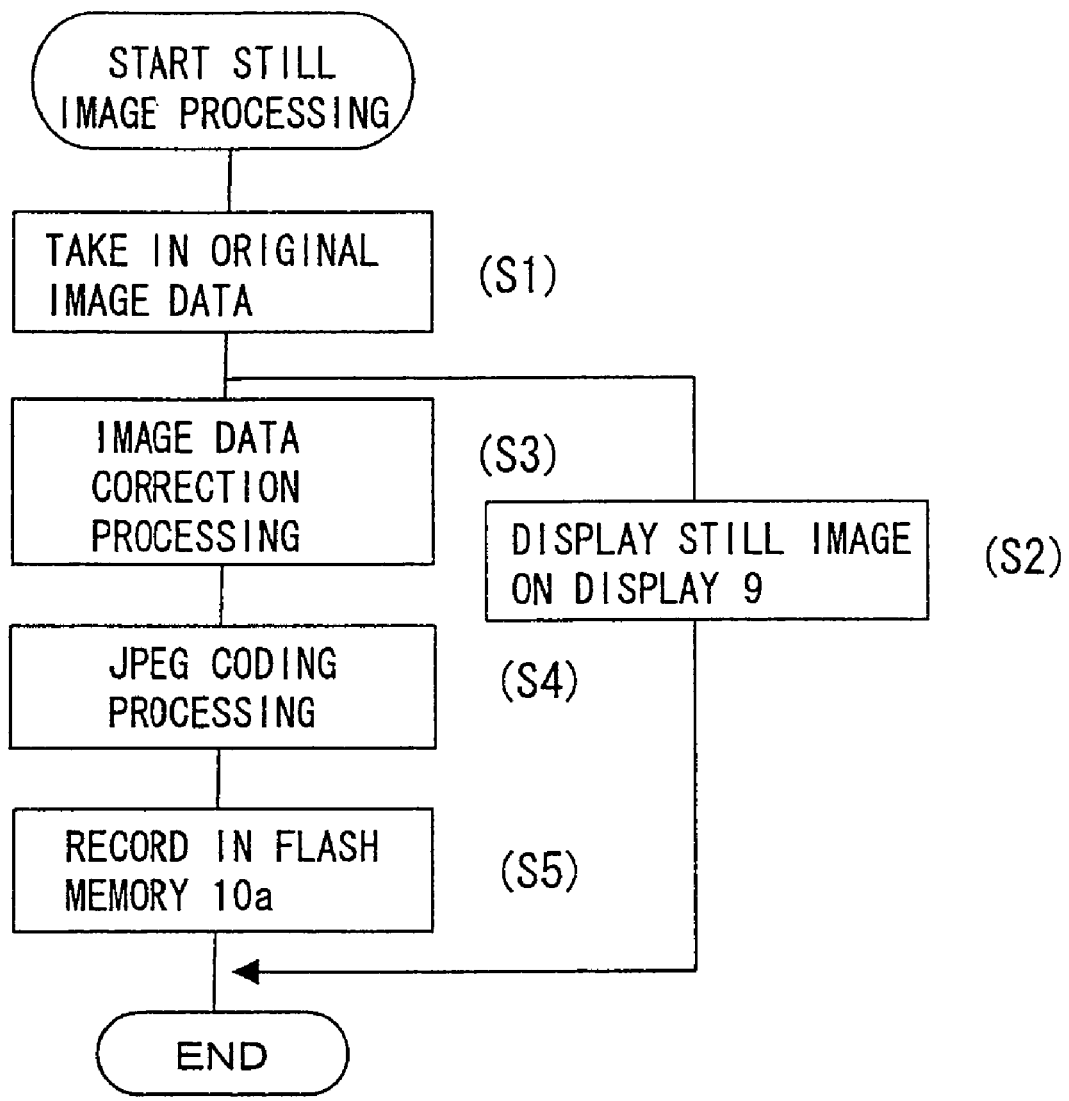
FIG. 6 is a flowchart showing operations of the electronic still camera according to the present embodiment.
Figure 7:
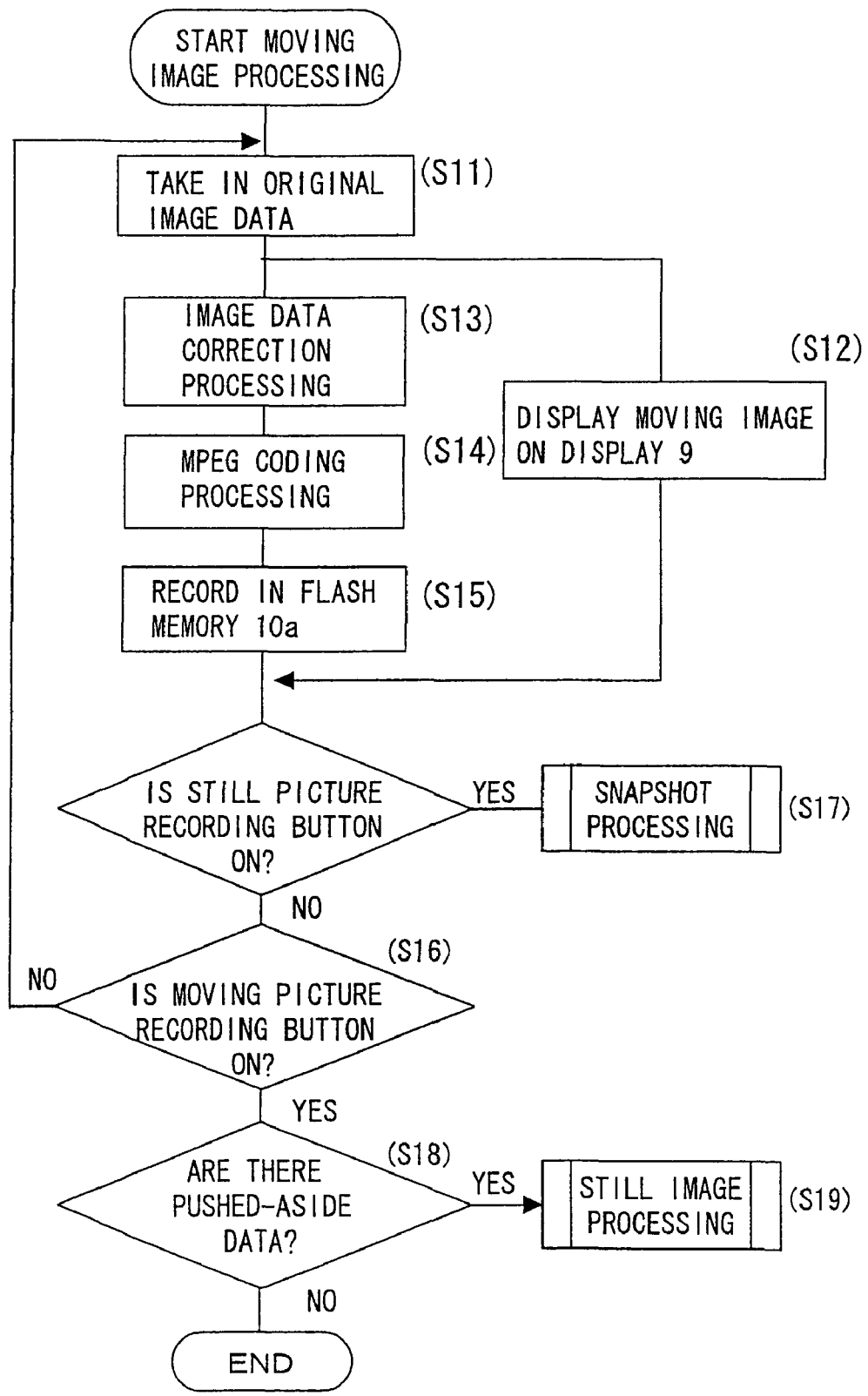
FIG. 7 is a flowchart showing operations of the electronic still camera according to the present embodiment.

Referring to FIG. 6, an original image signal taken in from the image pickup device 2 is inputted to the signal processing circuit 3 at a timing corresponding to the ON signal of the still picture recording button 15*a* and is then converted to digital original image data of one picture, so as to be taken into the frame buffer 7 (S1). The original image data of one picture are sent out from the frame buffer 7 to the image data correcting circuit 4 and are also sent out to the display circuit 8, so that the still image is displayed on the display 9 (S2).

The above-described correction processing designed for handling the still image is performed on the data taken in the image data correcting circuit 4 (S3), and the corrected data are inputted to the JPEG core circuit 5. Then, after a predetermined compression-coding processing is performed thereon (S4), they will be recorded in the flash memory 10*a* (S5).

(Moving Image Recording)

Referring to FIG. 7, the original image signal taken in from the image pickup device 2 is inputted to the signal processing circuit 3 at a timing corresponding to the ON signal of the moving picture recording button 15*b* and is then converted to picture-by-picture digital original image data, so as to be successively taken into the frame buffer 7 (S11). The picture-by-picture original image data are sent out from the frame buffer 7 to the image data correcting circuit 4 and are also sent out to the display circuit 8, so that the moving image is displayed on the display 9 (S12).

The above-described correction processing designed for handling the moving image is performed on the data successively taken in the image data correcting circuit 4 (S13), and the corrected data are inputted to the MPEG core circuit 6. Then, after a predetermined compression-coding processing is performed thereon (S14), they will be recorded in the flash memory 10*a* (S15). This operation continues until the ON signal is again sent out from the moving picture recording button 15*b* (S16).

(Snapshot Recording)

Figure 8:
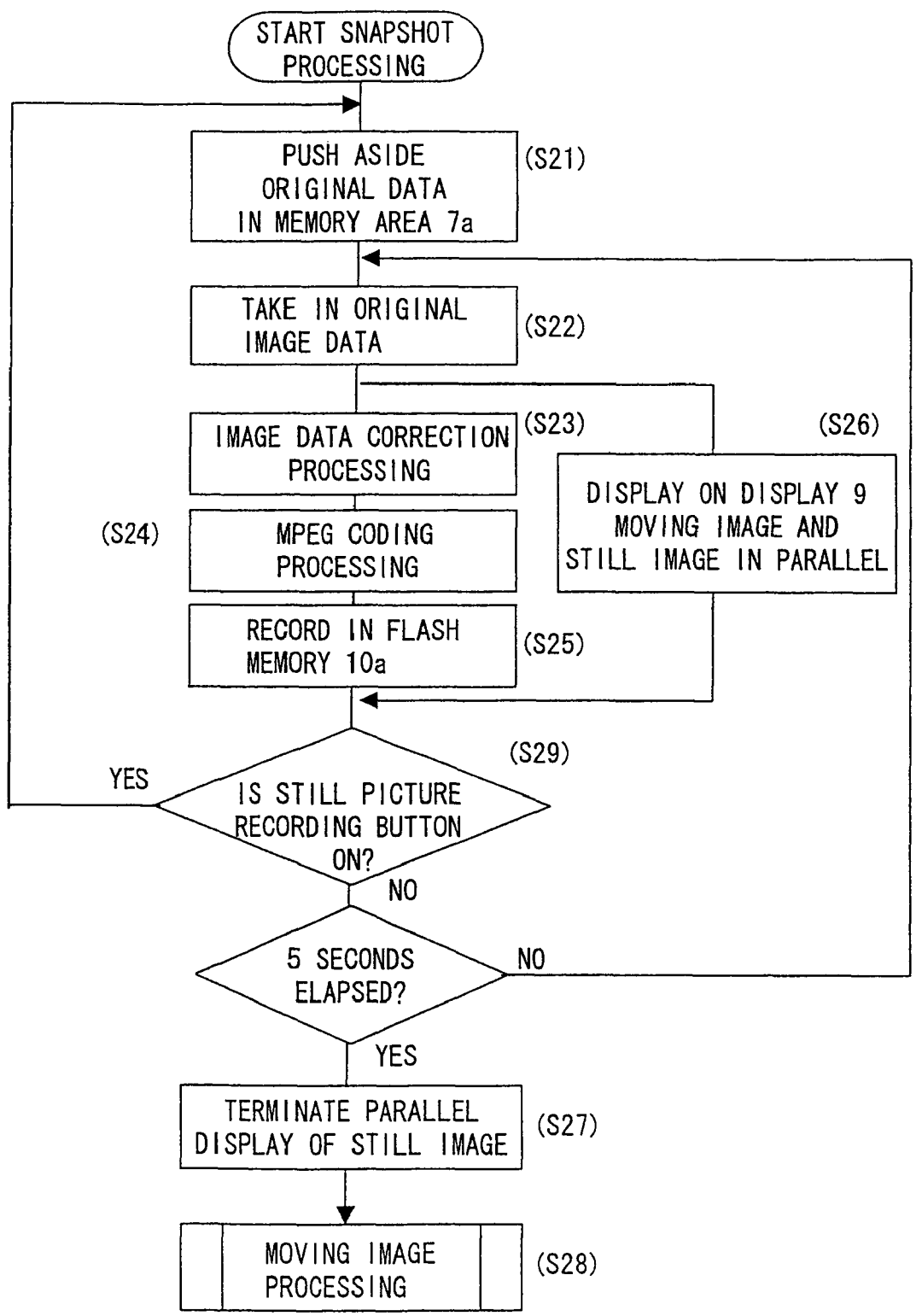
FIG. 8 is a flowchart showing operations of the electronic still camera according to the present embodiment.

Referring to FIG. 7, when the ON signal is sent out from the still picture recording button 15*a* during the recording of the moving image, the control core circuit 14 judges that snapshot shooting is instructed from an external source and then executes a snapshot processing shown in FIG. 8 (S17). Then, image data for one frame are temporarily pushed aside and stored in the memory area 7*a* for use in pushing aside in the frame buffer 7 (S21). During this pushing-aside operation, the recording of the moving image continues. In other words, the original image signal taken in from the image pickup device 2 is inputted to the signal processing circuit 3 and is then converted to picture-by-picture digital original image data, so as to be successively taken into the frame buffer 7 (S22). The picture-by-picture original image data are sent out from the frame buffer 7 to the image data correcting circuit 4 and are also sent out to the display circuit 8. The above-described correction processing designed for handling the moving image is performed on the data successively taken in the image data correcting circuit 4 (S23), and the corrected data are inputted to the MPEG core circuit 6. Then, after a predetermined compression-coding processing is performed thereon (S24), they will be recorded in the flash memory 10*a* (S25).

Figure 9:
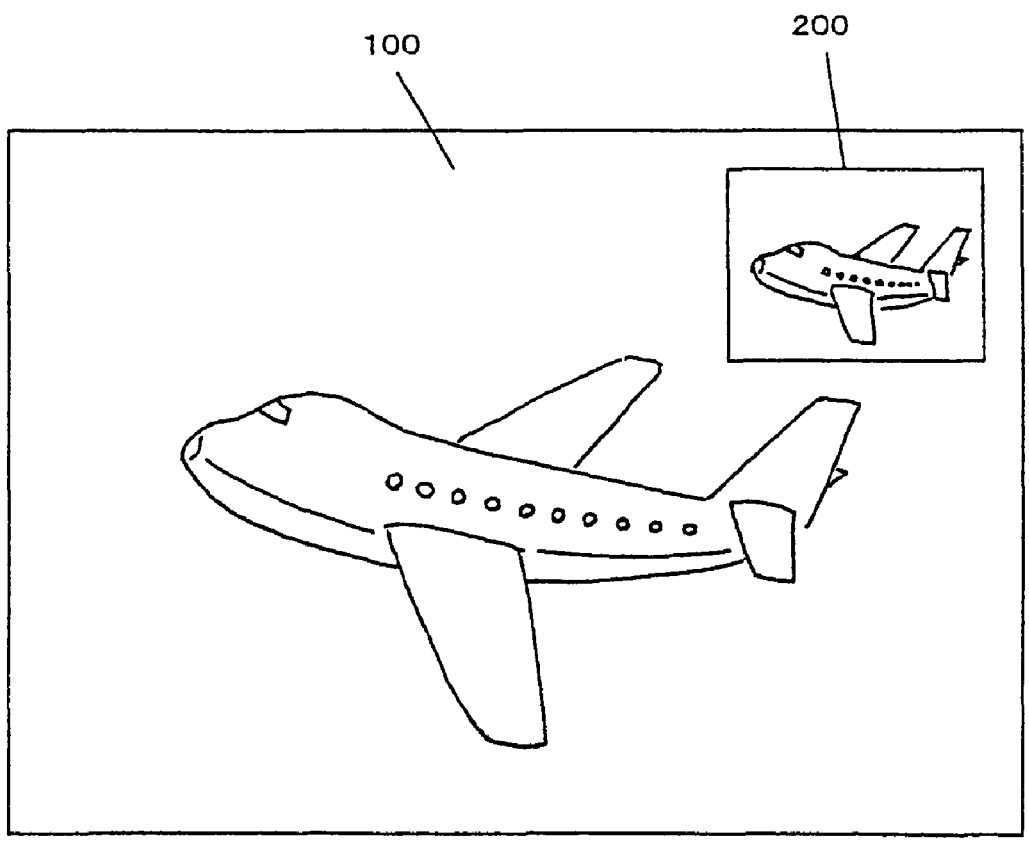
FIG. 9 shows a display screen obtained at the time of recording a snapshot by the electronic still camera, according to the present embodiment.

In the present embodiment, the picture-by-picture original image data are sent out from the frame buffer 7 to the display circuit and, together with this, the image data for one frame pushed aside in the memory area for use in pushing aside 7*a* are sent out. The moving image of being presently shot and the still image to be recorded as a snapshot are displayed in parallel (S26) on the display 9. FIG. 9 shows an example of the moving image and the still image being displayed on the display 9 in parallel, where a moving image 200 whose size is ⅟₁₆ of the picture is displayed in the upper right position of a screen while a still image 100 is displayed as a main picture.

The still image is displayed for predetermined time duration, for example, for five seconds and, thereafter, the display is switched to display of the moving image alone (S27) and the operation is returned to the normal display image processing shown in FIG. 7 (S28). During the parallel display of the still image the user can confirm on the display 9 whether or not a desired snapshot was shot. When the ON signal is again sent out from the still picture recording button 15*a* during the display of the still image, the processings of S21 to S27 are performed based on the data taken in at a timing corresponding to the ON signal (S29). In this case, the contents of the memory area for use in pushing aside 7*a* are replaced by new data.

Figure 10:
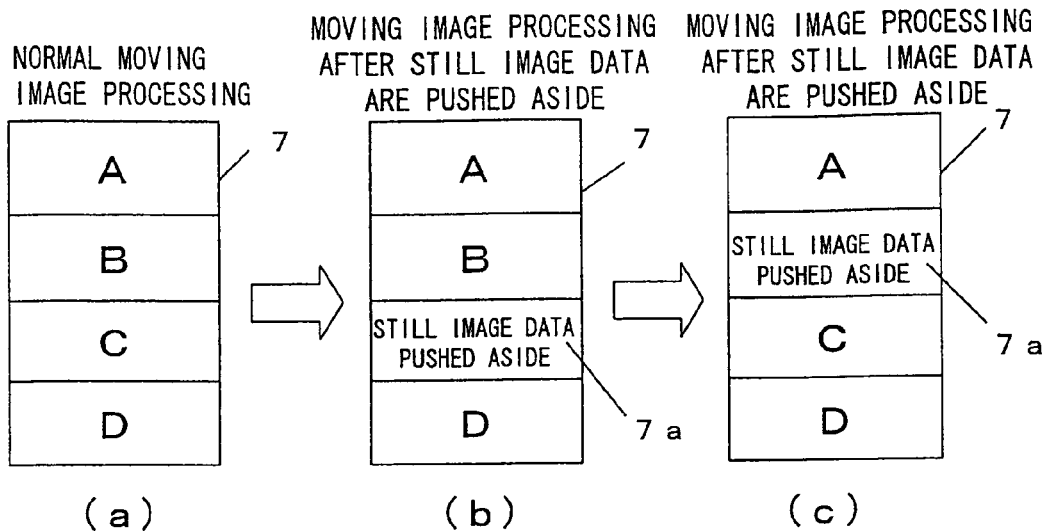
FIG. 10 is provided for describing a usage mode of a frame buffer, according to the present embodiment.

FIG. 10 is provided for explaining a usage state of the frame buffer 7 in the moving image processing and snapshot processing. The frame buffer 7 is provided with four normal memory areas A to D, and one picture, that is data for one frame, is stored for each memory area A-D. Of course, the number of the memory areas is changed as appropriate according to specifications of the camera 1.

In the normal moving image processing shown in FIG. 7, as shown in FIG. 10(*a*), the picture-by-picture digital original data from the signal processing circuit 3 are stored in the order of A→B→C→D and are outputted to the data bus 12 in the order starting from the one inputted first (First-In First-Out). When the data are stored in the last memory area D, the memory area A is again used. Namely, the memory areas A to D are used cyclically. For the cyclic use of the frame buffer 7, an LRU (Least Recently Used) algorithm and others such as a page memory control method may be adopted.

When the ON signal for a snapshot is sent out from the still picture recording button 15*a* during the processing of the moving images, the data taken in at a timing corresponding to the ON signal is stored in a certain memory area and said area is used, as it is, as the memory area 7*a* for use in pushing aside the still image data. For example, when data taken in at a timing of recording a snapshot are stored in the third memory area C, the memory area C is used as the memory area 7*a* for use in pushing aside, as shown in FIG. 10(*b*), and in the moving image processing thereafter the remaining memory areas A, B and D are used cyclically. Thereafter, when another data taken in again at a timing of recording a snapshot are stored in the second memory area B this time, the data at the third memory area C are cancelled, that is, the data are removed from a protected subject and the second memory area B is used as the memory area for use in pushing aside 7*a*, as shown in FIG. 10(*c*), and in the moving image processing thereafter the memory areas A, C and D other than the second memory area B are used cyclically.

As described above, the order in which the four memory areas A to D are used depends on the algorithm to be implemented; the memory areas may be used in the order, for example, ACDBAC . . . or ACDABC . . . or the like. In short, when there exist a plurality of memory areas which have stored processing-completed moving image data, that are, the moving image data in which overwriting thereof is allowed, any memory area may be utilized for use in pushing aside the data. In these cases too, such usage is called "cyclically used." When only two of the memory areas are prepared at first, the recording data of a snapshot are stored, so that the moving image data thereafter are successively outputted after the moving image data are taken in to a single memory area. In this case too, it is called "cyclically used."

When the moving image recording is completed, the control core circuit 14 judges whether or not the pushing-aside operation of the still image is performed during the recording of the moving image (S18) as shown in FIG. 7; if performed, the data, for one frame, which are being stored in the memory area for use in pushing aside 7*a* are transferred to the image data correcting circuit 4 via the data bus 12 and the similar processing to the still image recording is performed (S19).

The electronic still camera 1 according to the present embodiment provides the following operation and effects.

(1) Since the still image can be extracted as a snapshot during shooting of the moving image, the function as an electronic still camera improves.

(2) Since the still image is displayed as a snapshot on the display 9, the user can easily confirm a shooting state of the snapshot and he/she can take another snapshot in no time if he/she doesn't like the snapshot. Thereby, frequency of mis-shooting snapshots can be reduced. Thus, the value of merchandise as an electronic still camera can be raised.

(3) In addition to the above (2), the moving image which is presently being shot is displayed in parallel, so that a shooting state of the moving image can also be confirmed in real time.

(4) In addition to above (2) and (3), a shooting state of the snapshot can be easily confirmed by displaying the still image to be recorded as a main picture on the display 9 while the moving image is displayed in a small size.

(5) In addition to the above (2), since the still image to be recorded as a snapshot is displayed temporarily on the display 9, the operation necessary for confirming the recording of the moving images on the display 9 will not be interfered for long period of time.

(6) As shown in FIG. 10, the memory area for use in pushing aside 7*a* will not be provided until a still shooting for a snapshot is instructed and all are utilized as normal memory areas, so that use efficiency of the frame buffer 7 is enhanced.

(7) The still image data can be corrected to a further optimal image by using the data correcting circuit 4.

(8) Since it is so structured that not only the moving image data but also the still image data passes through the data correcting circuit 4, the still image can also be correction-processed by merely storing coefficients in the ROM 24, thus realizing low cost and function improvement. Since no correcting circuiting for exclusive use with the still image needs to be provided, the tendency of the apparatus to become large-sized as well as the increase in power consumed can be prevented.

(9) The DCT circuit 16, the quantization circuit 17, the Huffman coding circuit 18, the Huffman decoding circuit 19, the inverse quantization circuit 20 and the inverse DCT (IDCT; Inverse DCT) circuit 21 are shared in the JPEG core circuit 5 and the MPEG core circuit 6, so that the structure of the electronic still camera 1, an arithmetic processing algorithm and so forth can be simplified.

(10) Provision of the memory area 7*a* for use in pushing aside for the snapshot facilitates the sorting and search of the still image and the moving image, and makes possible a faster reproduction.

(11) When the snapshot shooting is instructed, image data prior to being inputted to the image data correcting circuit 4 are pushed aside; as a result, filtering processing and zooming processing in the vertical direction will be facilitated when thereafter processing the data at the image data correcting circuit 4, and the moving images can be recorded without being interrupted.

The present embodiments include the following modified examples.

(i) At S26 in FIG. 8, the still image alone is displayed on the display 9.

(ii) At S26 in FIG. 8, the size of the still image and that of the moving image displayed on the display 9 in parallel are reversed, so that the moving image becomes the main picture. Moreover, a structure is provided such that permission and denial of the display of the still image can be instructed by the user using a button or the like.

Figure 11:
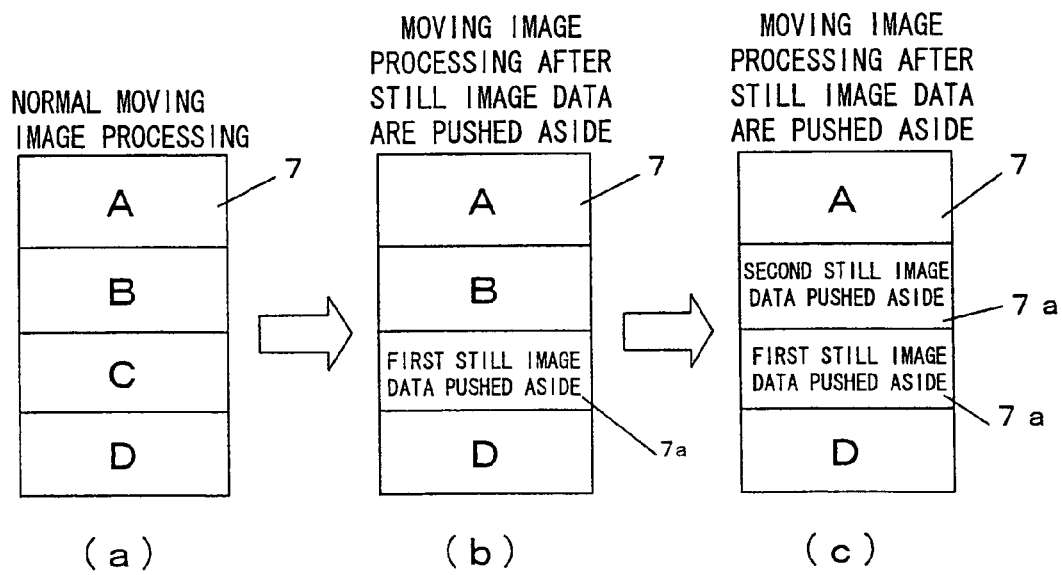
FIG. 11 is provided for describing another example of the usage mode of the frame buffer, according to the present embodiment.

(iii) At S29 in FIG. 8, image data for a newly taken snapshot is stored in parallel with old data which is not replaced thereby. Namely, as shown in FIG. 11, in the normal moving image processing the memory areas A-D of the frame buffer 7 are used cyclically (FIG. 11(*a*)). Next, when data taken in at a timing the first snapshot is recorded is stored in the third memory area C, the memory area C is used as the memory area for use in pushing aside 7*a* (FIG. 11(*b*)), and in the moving image processing thereafter, the remaining three memory areas A, B and D are used cyclically. When data taken in at a timing the second snapshot is recorded is stored in the second memory area B, the second and third memory areas B and C are used as the memory area for use with pushing aside 7*a* (FIG. 11(*c*)), and in the moving image processing thereafter, two memory areas A and D are used cyclically, that is, alternately. In this manner, a plurality of snapshots can be recorded. Increasing the number of snapshots, which can be taken, will reduce the area in which the frame buffer 7 can be used in the moving image processing. Thus, the number of snapshots which can be taken needs to be set to the degree that overflow of the frame buffer 7 does not occur at the time of processing the moving images.

(iv) A magneto-optical disk, optical disk, magnetic disk or the like is used in place of the memory card 10.

(v) When the shooting for taking a snapshot is instructed, the image data in which a processing has been completed at the image data correcting circuit 4 are temporarily pushed aside to the memory area for use in pushing aside 7*a*. By so doing, the data can be easily taken out when a predetermined compression processing is performed in the JPEG core circuit 5 thereafter.

(vi) The still image data do not go through the image data correcting circuit 4.

(vii) The M-JPEG techniques are used in compression and expansion of the moving image data.

(viii) In addition to JPEG used for the compression and expansion of the still image data, compression technology using the difference-processing-based difference YUV, the block-based Hadamard transform, the Slant transform or Haar transform method is used for the compression of the still image data.

(ix) When the filtering processing is performed on the still image data, a low-pass filter, a band-pass filter or the like may be formed by setting each coefficient value so that a high frequency range is not emphasized. Thereby, the aliasing or jaggy may be suppressed.

(x) When the filtering processing is performed on the still image data, a dynamic range of a color signal is extended and each coefficient value is set so as to obtain a vivid image.

Besides, arbitrary linear or nonlinear filter can be used in accordance with use or user's taste.

(xi) As shown in FIG. 1, the selection button 15c is provided which selects the correcting functions of the above embodiments and the above (ix) and (x). Thereby, the still image in accordance with the user's taste can be formed, and the function as the electronic still camera 1 is further enhanced. The selection button 15c is an example of a "selector" in the present invention.

(xii) The filtering processing in the image data correcting circuit 4 may be such that the filtering processing can be set to the identity transform processing. In that case, the still image data inputted are outputted as kept intact. In this structure, the filter function can be easily put to effective use when necessary. In order to realize the identity transform, for example, in FIG. 4, coefficient $\alpha_1$ only is set to 1 and the remaining coefficients $\alpha_{n-1} \ldots \alpha_2, \alpha_1$ are all set to 0. The present invention is characterized in the feature that the still image data and the moving image data are made to pass through the image data correcting circuit 4, and the identity transform processing, of course, belongs to the concept of the filtering processing.

(xiii) Though described is that either the snapshot or the moving image is displayed in the main picture, which one is to be set to the main picture may be user-selectable. The control core circuit 14 may switch which one is set to the main picture, by the operation of the selection button 15c or the like by the user. Moreover, the control core circuit 14 may include a mode by which the display of the snapshot is prohibited according to the user's instruction, or the snapshot may be displayed for the time duration specified by the user.

INDUSTRIAL USABILITY

As have been described, the present invention can be used for the digital camera or the image processing method, image processing apparatus and the memory control circuit which can be used therefor.

What is claimed is:

1. a digital camera comprising:
    a storage unit which includes a memory area to sequentially and temporarily store moving image data comprising a series of frames;
    a display control unit which generates an image signal from the series of frames in the memory area to display a series of images as a moving image on a display; and
    a control unit which responsive to a still image capture instruction signal to be input when the series of images is being displayed as the moving image, on the display as a moving image, assigns part of captures a single frame stored in the memory area, the single frame corresponding to one of the series of images on the display when the still image capture instruction signal is input, so as to maintain the captured single frame in the memory area to, instructs said display control unit to display on the display a still image from the captured single frame stored in the memory assigned area together with the moving image and instructs said display control unit to stop display on the display the still image together with the moving image if still image capture instruction signal is not inputted after a predetermined time, wherein
    when the single frame is captured, the storage unit sequentially and temporarily overwrites previous moving image data with subsequent moving image data in the memory area other than an area where the captured single frame is maintained.

2. A digital camera as recited in claim 1, further comprising a unit which inputs the still image capture instruction signal.

3. A digital camera as recited in claim 1, wherein said control unit controls said display control unit in a manner such that a still image displayed during display of a moving image is displayed on the display in parallel with the moving image.

4. A digital camera as recited in claim 3, wherein said control unit controls said display control unit in a manner such that the still image is set to a main picture of the display so as to be displayed thereon.

5. A digital camera as recited in claim 3, wherein said control unit controls said display control unit in a manner such that the moving image is set to a main picture of the display so as to be displayed thereon.

6. A digital camera as recited in claim 1, wherein said control unit controls said display control unit in a manner such that the still image is displayed for a predetermined period of time.

7. A digital camera as recited in claim 1, wherein said control unit controls said display control unit in a manner such that either the still image or the moving image is selected in a switchable manner and thus is set to a main picture of the display so as to be displayed thereon.

8. A digital camera as recited in claim 1, wherein said control unit sets said display control unit in a manner that permission/denial of display of the still image is switchable.

9. A digital camera as recited in claim 1, wherein said control unit controls said display control unit in a manner that the still image is displayed for time duration only according to a user's instruction.

10. A digital camera, comprising:
    a storage unit which includes a memory area to sequentially and temporarily store moving image data comprising a series of frames;
    a moving image encoder which codes the shot image data read from the storage unit as a moving image comprising a plurality of frames;
    a display control unit which generates an image signal from the series of frames in the memory area to display a series of images as a moving image on a display;
    a control unit which, responsive to a still image capture instruction signal to be input when the series of images is being displayed as the moving image, captures a single frame stored in the memory area, the single frame corresponding to one of the series of images on the display when the still image capture instruction signal is input, so as to maintain the captured single frame in the memory area, instructs said display control unit to display on the display a still image from the captured single frame stored in the memory area together with the moving image and instructs said display control unit to stop display on the display the still image together with the moving image if still image capture instruction signal is not inputted after a predetermined time;
    the storage unit sequentially and temporarily overwriting previous moving image data with subsequent moving image data in the memory area other than an area where the captured single frame is maintained when the single frame is captured;
    a still image encoder which codes the captured single frame from the storage unit;
    a moving image encoder which codes the moving image data read from the storage unit; and an interface for an external memory which records the captured single frame coded by said still image encoder and the moving image data coded by said moving image encoder.

11. A digital camera as recited in claim 10, further comprising a unit which inputs the still image capture instruction signal.

12. A digital camera as recited in claim 10, wherein said control unit controls said display control unit in a manner such that a still image displayed during display of a moving image is displayed on the display in parallel with the moving image.

13. A digital camera as recited in claim 12, wherein said control unit controls said display control unit in a manner such that the still image is set to a main picture of the display so as to be displayed thereon.

14. A digital camera as recited in claim 12, wherein said control unit controls said display control unit in a manner such that the moving image is set to a main picture of the display so as to be displayed thereon.

15. A digital camera as recited in claim 10, wherein said control unit controls said display control unit in a manner such that the still image is displayed for a predetermined period of time.

16. A digital camera as recited in claim 10, wherein a coding unit of said still image encoder and that of said moving image encoder are shared in common.

17. A digital camera as recited in claim 10, wherein said control unit controls said display control unit in a manner such that either the still image or the moving image is selected in a switchable manner and thus is set to a main picture of the display so as to be displayed thereon.

18. A digital camera as recited in claim 10, wherein said control unit sets said display control unit in a manner that permission/denial of display of the still image is switchable.

19. A digital camera as recited in claim 10, wherein said control unit controls said display control unit in a manner that the still image is displayed for time duration only according to a user's instruction.

* * * * *